(No Model.)
E. E. NEAL.
DEVICE FOR RELEASING CHECK REINS.
No. 363,414. Patented May 24, 1887.
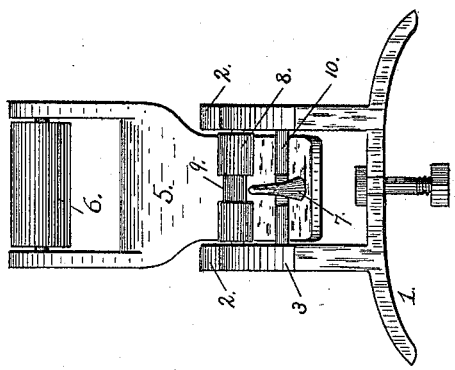
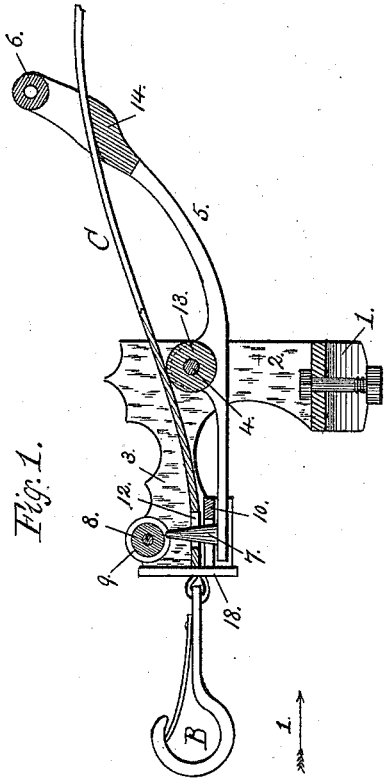
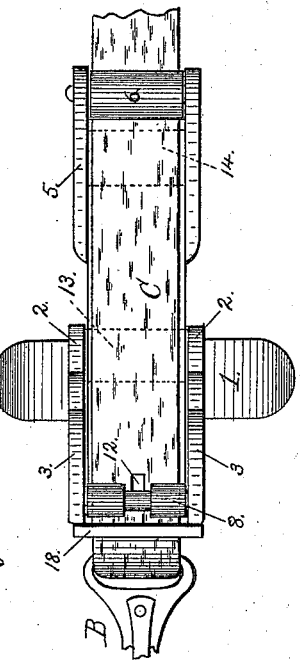
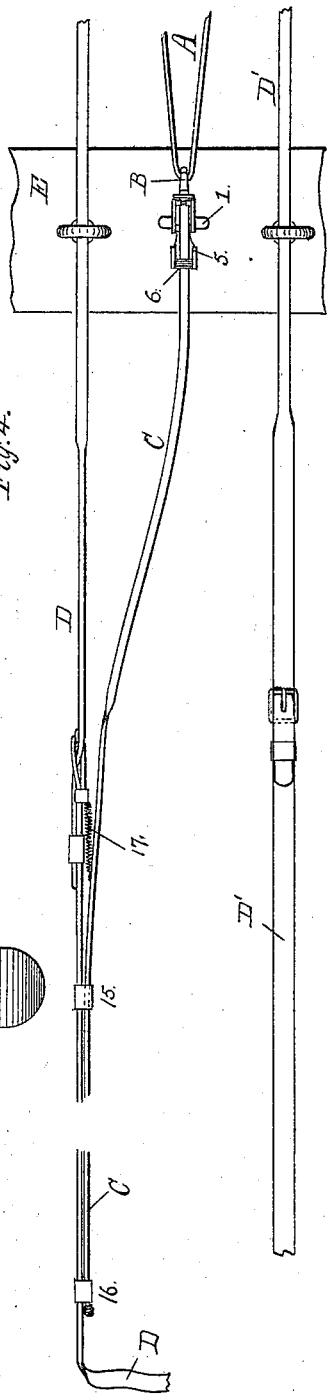
Witnesses.
H. E. Lodge
Samuel Atwood
Inventor.
Enoch E. Neal.
F. Curtis, atty.

UNITED STATES PATENT OFFICE.

ENOCH E. NEAL, OF OSSIPEE, NEW HAMPSHIRE.

DEVICE FOR RELEASING CHECKREINS.

SPECIFICATION forming part of Letters Patent No. 363,414, dated May 24, 1887.

Application filed October 11, 1886. Serial No. 215,896. (No model.)

*To all whom it may concern:*

Be it known that I, ENOCH E. NEAL, a citizen of the United States, residing at Ossipee, in the county of Carroll and State of New Hampshire, have invented certain new and useful Improvements in Devices for Releasing Checkreins; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for releasing checkreins, particularly that class which are provided with a hook affixed to a strap connecting with the part of the reins in reach of the driver, so that the latter may, whenever he sees fit, release or secure the checkrein.

My invention consists of an ornamental frame secured upon the saddle of the harness and provided with a gravity-latch and prong, the latter of which is adapted to enter the strap, and thus hold the checkrein. This strap, by a slight lifting of the reins, serves to raise the free end of the gravity-latch, the prong of which is disengaged from the strap and the checkrein released.

Heretofore a pivoted check-hook has sometimes been employed in combination with a checkrein which passes through an opening in the rear end of said hook, said checkrein being provided with two openings, and the operative end of said hook entering one or the other, according as it is desired to hold the horse's head in a comfortable position or in one which will prevent kicking. This, however, is not my construction nor my object.

The drawings accompanying this specification represent, in Figure 1, a longitudinal sectional elevation. Fig. 2 is an end view in direction of arrow 1 in Fig. 1, and Fig. 3 is a plan of an apparatus embodying my invention, while Fig. 4 is a plan showing the application thereof to a harness.

In said drawings, 1 represents a curved plate adapted to conform to a harness-saddle, upon which it is to be affixed by a bolt or otherwise. Upon this plate, integrally cast therewith, are formed two vertical housings or standards, 2 2, with horizontal arms 3 3. Between said housings, and pivotally mounted upon the pin 4, is placed a gravity-latch, 5, the free end or rear portion of which is curved upward and provided with a transverse bar. Moreover, an anti-friction roller, 6, is placed a short distance above it, while the strap which secures the checkrein passes between the two. The front end of said latch 5 is armed with a vertically-projecting prong or pointed stud, 7, adapted to co-operate with a roller, 8, annularly slotted at 9, and mounted between the arms 3 3, which are here united by a transverse bar, 10, the latter serving as a stop for the gravity-latch. Furthermore, in said drawings, A represents the checkrein proper removably secured to the hook B, which is attached to the end of a strap, C. This latter extends back, and is attached to one of the reins in a position to be operated by the driver. E is a plan of a harness-saddle to which my apparatus is attached. In the present instance the strap C is provided with an elongated hole, 12, just in rear of the hook B, and receives the prong 7 when the checkrein is made fast. To the rear of the hook, but between the latter and the hole 12, a stop, 18, is secured upon the strap C. This stop in the act of fastening the checkrein comes in contact with the ends of the arms 3 3, and thus predetermines the position of the hole 12 with respect to the prong 7, which will engage it to a certainty. The position of the strap C lies between the roller 8 and transverse bar 10, connecting the arms 3 3, passes above the anti-friction roll 13, and rests upon the connecting-bar 14 in the free end of the gravity-latch; thence it continues to the reins. The terminal and operative end of this strap C extends through the loops 15 16 upon the rein D, and is attached to the latter by a spring medium, 17, preferably secured near one of the buckles which unite the different portions of the reins.

In the employment of this detaching device it is necessary to be able to shorten the reins in the act of turning or stopping without operating the checkrein B. To this end the strap C must be maintained slack. Thus the spring 17, after the strap has been drawn tight to operate and release the checkrein, acts to return the strap in the opposite direction, that it may hang loosely again upon the latch with the slack requisite for the proper handling of the reins in the act of driving.

To release the checkrein, the reins should be first drawn fairly tight, when the end of the strap C is grasped and pulled against the tension of the spring 17 until the slack is removed, when a slight lifting of the rein D and strap C brings the latter against the roller 6 in the free end of the latch 5, which is thereby raised, while its opposite end will be depressed and with it the prong 7. The latter is now disengaged from the hole 12, and the checkrein A, hook B, and strap C are free to advance, the anti-friction rollers 6, 8, and 13 permitting the latter to pass along easily and remove any undue pressure upon the bit.

Reverse and locking movement of the checkrein is effected by simply pulling the latter back until the stop 18 on the strap C prevents further motion by meeting the ends of the arms 3 3, when the prong at once drops into the hole 12, advancing upward by gravity and by the pressure of the strap upon the free end of the latch 5. The strap C is now prevented from slipping over and becoming unfastened from the prong by means of the annular notch 9, formed in the roll 8, and with which said prong is engaged.

The spring medium shown at 17 may be formed of rubber, if preferred, or from some other analogous elastic material.

I claim—

1. The combination, with the reins, the saddle of a harness, and the gravity-latch mounted on said saddle, of the checkrein, hook, and strap secured to one of the reins by a spring and loops, all operating with the checkrein, substantially as and for the purposes herein described.

2. The locking and releasing device for checkreins, composed of the base 1, secured to the harness-saddle, the standards 2 2, arms 3 3, and the gravity-latch 5, having the prong 7, which engages the grooved roller 8, substantially as stated.

3. The checkrein A, hook B, its stop 18, and the saddle E, provided with the gravity-latch 5, in combination with the reins D D', and the strap C, connected with one of said reins by a spring medium, substantially as and for purposes specified.

4. The combination, with the checkrein A, its hook B, and the strap C, pierced at 12 and secured to one rein by a spring, 17, of the standards 2 2, the gravity-latch 5, with its prong 7, the bar 6, and roller 8, co-operating with said prong, substantially as described.

In testimony whereof I affix my signature in presence of two witnesses.

ENOCH E. NEAL.

Witnesses:
H. E. LODGE,
F. CURTIS.